United States Patent
Turina et al.

(10) Patent No.: US 6,501,745 B1
(45) Date of Patent: Dec. 31, 2002

(54) METHOD FOR VARIABLE BLOCK SCHEDULING INDICATION BY AN UPLINK STATE FLAG IN A PACKET DATA COMMUNICATION SYSTEM

(75) Inventors: Dalibor Turina, Täby (SE); Bengt Persson, Djursholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/201,777

(22) Filed: Dec. 1, 1998

Related U.S. Application Data (60) Provisional application No. 60/074,688, filed on Feb. 13, 1998.

(51) Int. Cl.[7] .................................................. H04J 3/16
(52) U.S. Cl. ...................................... 370/337; 370/347
(58) Field of Search ................................. 370/351, 352, 370/389, 398, 399, 401, 402, 403, 336, 337, 493, 528, 345, 347, 465, 494, 332, 441, 442, 346, 341, 338, 334, 329, 326, 321, 314, 522, 524, 480; 455/422, 466, 332, 522, 456, 457, 524, 428, 437, 452, 455, 15, 509, 516, 517

(56) References Cited

U.S. PATENT DOCUMENTS

| | | |
|---|---|---|
| 5,420,864 A | 5/1995 | Dahlin et al. |
| 5,590,133 A * | 12/1996 | Billstrom et al. ............ 370/332 |
| 6,233,231 B1 * | 5/2001 | Felix et al. .................. 375/130 |
| 6,282,182 B1 * | 8/2001 | Pelen et al. .................. 370/493 |

FOREIGN PATENT DOCUMENTS

| | | |
|---|---|---|
| EP | 0587980 A2 | 3/1994 |
| WO | 97/33389 | 9/1997 |
| WO | 98/37706 | 8/1998 |

OTHER PUBLICATIONS

Turina et al., "A Proposal for Mulit–Slot MAC Layer Operationfor Packet Data Channel in GSM", ICUPC, vol. 2, 1996, pp. 572–576.

* cited by examiner

*Primary Examiner*—Dang Ton (57) ABSTRACT

A packet data communication system uses an USF (Uplink State Flag) transmitted on the downlink and interleaved with downlink data, to schedule traffic on the uplink for one or several mobile users utilizing the same physical channel. The USF indication is made variable and defined in the control signaling at setup of a packet transmission. An USF indicates to a mobile that one or several consecutive radio blocks is reserved for uplink transmission from a specific mobile. The mobile does not have to receive the USF during the remaining period defined by the number of radio blocks scheduled. The solution is especially advantageous in combination with adaptive antennas when all radio blocks on the downlink transmissions do not have to be broadcast to all users on a certain channel.

23 Claims, 6 Drawing Sheets

| Downlink | USF=R1 | USF=R2 | USF=F |

| Uplink | Data(MS1) | Data(MS2) | PRACH |

FIG. 3

| Downlink | 1 | 1 | 1 | 1 | 2 | 2 | 2 | 2 | 3 | 3 | 3 | 3 | 4 | 4 | 4 | 4 |

| Uplink | 1 | 1 | 1 | 1 | 2 | 2 | 2 | 2 | 3 | 3 | 3 | 3 | 4 | 4 | 4 | 4 |

METHOD FOR VARIABLE BLOCK SCHEDULING INDICATION BY AN UPLINK STATE FLAG IN A PACKET DATA COMMUNICATION SYSTEM

The present application claims priority from U.S. Provisional Application No. 60/074,688, filed Feb. 13, 1998, the disclosure of which is incorporated by reference herein.

BACKGROUND

The present invention relates generally to packet data communication systems and, more particularly, to a method and apparatus for dynamic transmission resource allocation.

The growth of commercial communication systems and, in particular, the explosive growth of cellular radiotelephone systems, have compelled system designers to search for ways to increase system capacity without reducing communication quality beyond consumer tolerance thresholds. At the same time usage of mobile communication equipment for transmission of data rather than speech has become increasingly popular by consumers. The possibility to send and receive electronic mail and to use a web browser to obtain world-wide-web access is frequently discussed as services that will be more and more used in wireless communication systems. As a response to this, communication system designers search for ways to efficiently transfer data information to and from mobile users.

There are fundamental differences between requirements for data communication and e.g., speech communication. For example, delay requirements are higher for speech, which is a real time service, and the error requirements are higher for data communication, while the delay constraints are lower. The use of packet data protocols, which are more suitable for transmission of data than circuit switched protocols, starts to find its way into cellular communication systems. Packet service integration in both GSM cellular systems as well as DAMPS cellular systems is presently being standardized.

Today, GSM systems provide a circuit switched data service, which can be used to interconnect with external data networks. The circuit switched data service is used for both circuit switched as well as packet switched data communication. To make packet switched data communication more efficient, a new packet switched data service called GPRS (General Packet Radio Services) is introduced as a part of GSM. GPRS will allow for packet switched communication e.g., IP or virtual circuit switched communication. GPRS will support both connectionless protocols (e.g., IP) as well as a connection-oriented protocol (X.25). One of the advantages with a packet switched data communication protocol is that a single transmission resource can be shared between a number of users. Thus, in the case of e.g., a GSM cellular system, a timeslot on a radio frequency carrier can be utilized by several mobile users for reception and transmission of data. The shared transmission resource is managed by the network side of the cellular system both for downlink and uplink transmissions.

GPRS is a GSM service and parts of the GSM infrastructure will be used. Those parts of the GSM communication system are described in European Telecommunication Standard Institute (ETSI) document ETS 300 574 which is incorporated by reference herein.

An advantage of introducing a packet data protocol in cellular systems is the ability to support high data rate transmissions and at the same time achieve a flexibility and efficient utilization of the radio frequency bandwidth over the radio interface. The concept of GPRS is designed for so-called "multislot operations" where a single user is allowed to occupy more than one transmission resource simultaneously.

Figure 1:
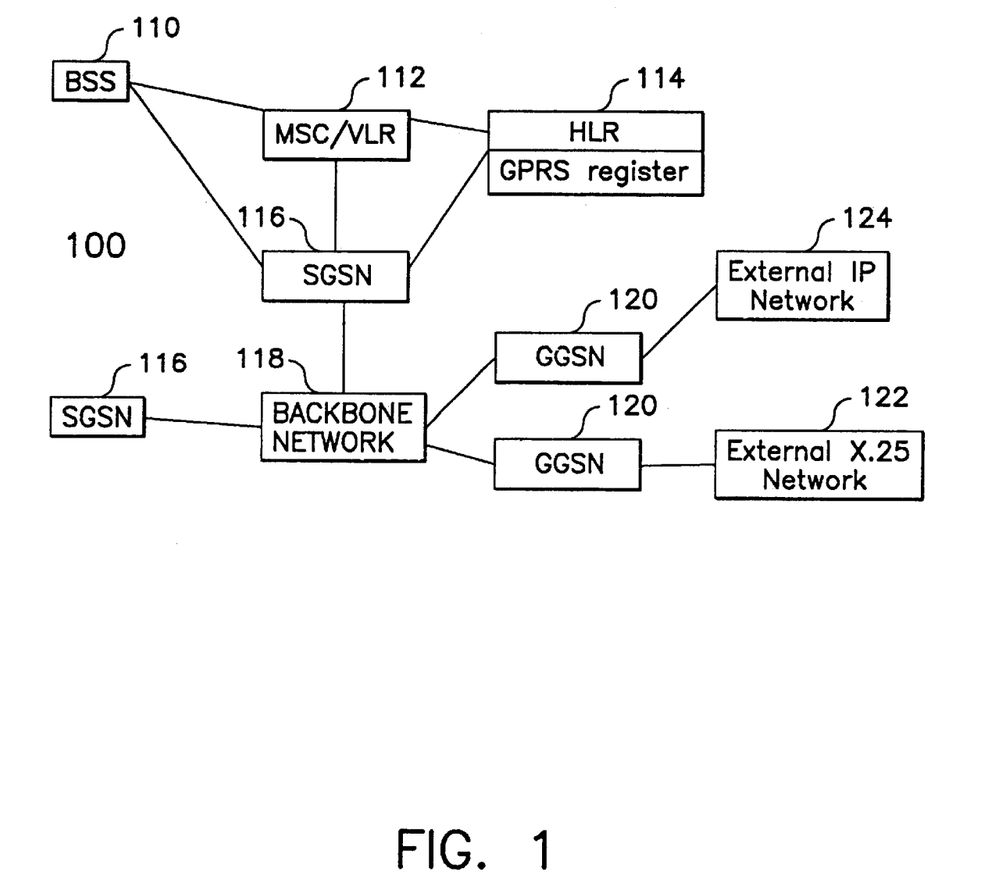
FIG. 1 illustrates a GPRS network architecture.

An overview of the GPRS network architecture is illustrated in FIG. 1. Information packets from external networks 122, 124 will enter the GPRS network at a GGSN (Gateway GPRS Service Node) 120. The packet is then routed from the GGSN via a backbone network, 118, to a SGSN (Serving GPRS Support Node), 116, that is serving the area in which the addressed GPRS mobile resides. From the SGSN the packets are routed to the correct BSS (Base Station System), in a dedicated GPRS transmission. A GPRS register, 115, will hold all GPRS subscription data. The GPRS register may, or may not, be integrated with the HLR (Home Location Register) 114 of the GSM system. Subscriber data may be interchanged between the SGSN and the MSC to ensure service interaction, such as restricted roaming.

Figure 2:
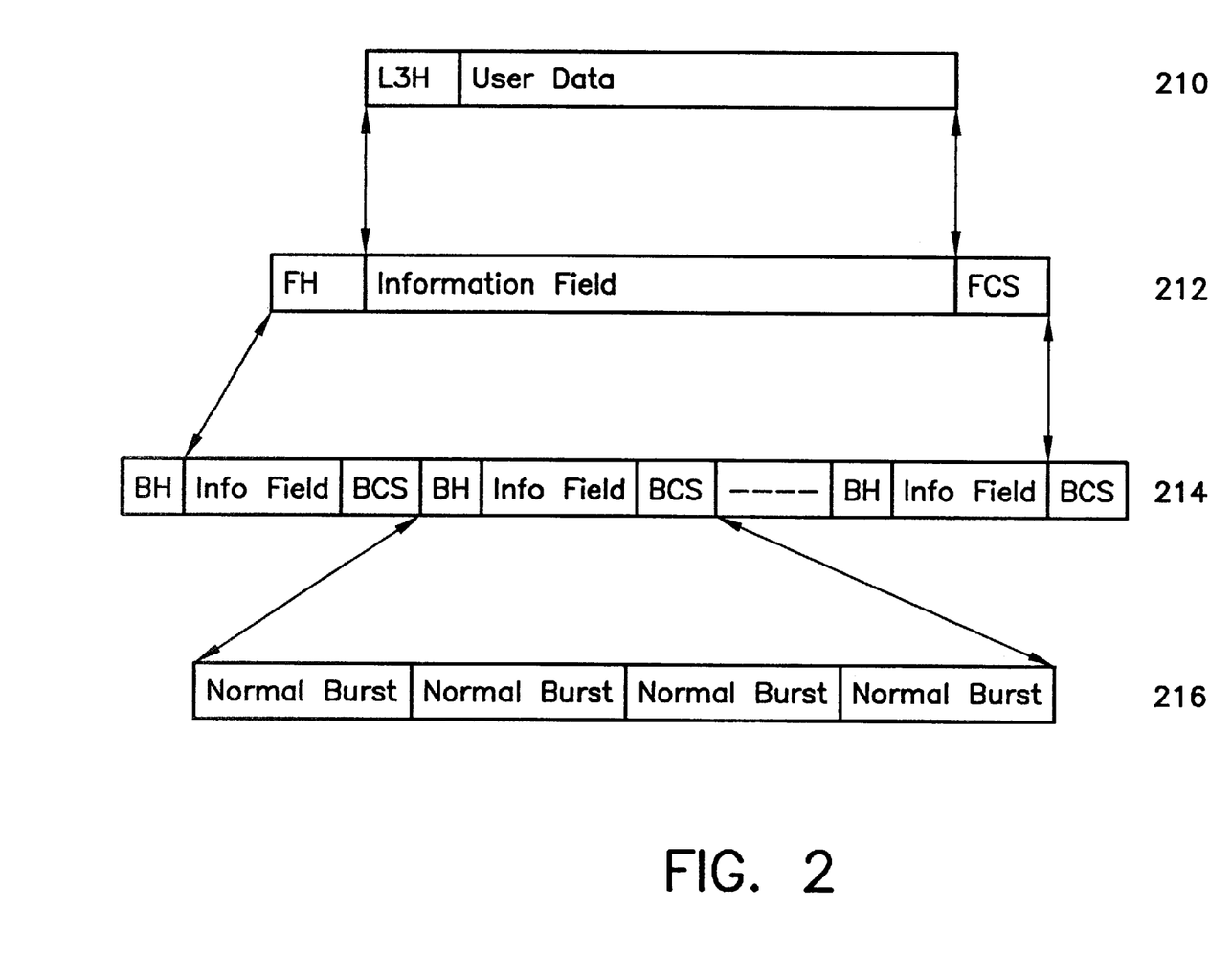
FIG. 2 illustrates a packet transmission flow and information mapping in an exemplary packet data communication system.

FIG. 2 illustrates packet transformation flow for a GPRS system. This is also briefly described in D. Turina et al., "A Proposal for Multi-Slot MAC Layer Operation for Packet Data Channel in GSM", ICUPC, 1996, vol.2, pp.572–576, which is incorporated by reference herein.

The packets which are received from the network, 210, are mapped onto one or more logical link control (LLC) frames, 212, containing an information field, a frame header (FH) and a frame check sequence (FCS). An LLC frame is mapped onto a plurality of radio link data blocks (RLC data blocks) 214, each of which include a block header (BH), information field and block check sequence (BCS), which can be used in the receiver to check for errors in the information field. A block, as is recognized by those skilled in the art, is the smallest part of the packet which is re-transmittable over the air interface. The RLC blocks are further mapped onto physical layer radio blocks. In a GPRS system, one radio block is mapped onto four normal bursts sent consecutively on one GSM physical channel.

Figure 3:
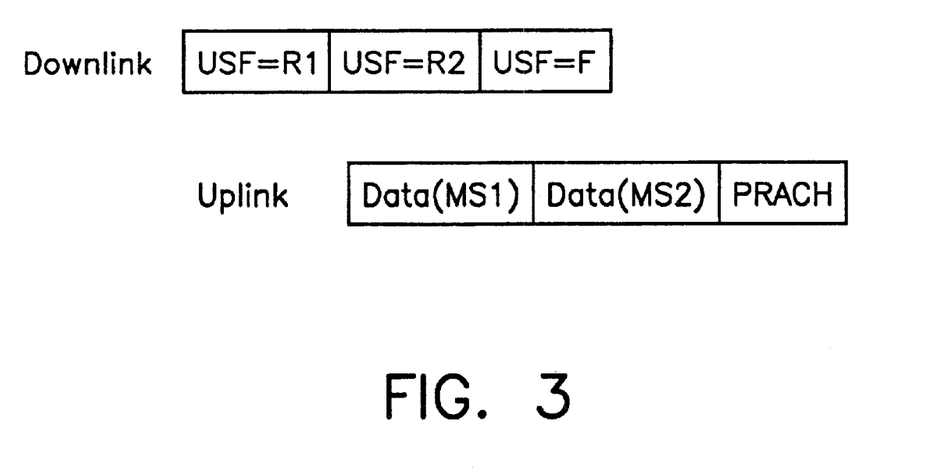
FIG. 3 illustrates an USF flag indicating uplink transmission multiplexing.

The block header includes an Uplink State Flag (USF) field to support the dynamic medium access method on the uplink. The USF is used in a packet data channel to allow multiplexing of radio blocks from a number of mobile users, i.e., dynamic allocation of shared transmission resources in the uplink. The USF contains 3 information bits allowing for coding of eight different USF states which are used to multiplex the uplink traffic. The USF is included in the beginning of each radio block transmitted in the downlink, i.e., interleaved with downlink traffic to a specific mobile user. Since the USF is transmitted in every radio block in the downlink, all mobiles that use the dynamic allocation method and share a certain transmission resource must, therefore, always listen to the downlink channel to determine whether the USF indicates free uplink transmission for any of the mobiles. If a mobile user is indicated by a USF, transmission in the uplink is allowed in the next uplink radio block. This technique is illustrated in FIG. 3, where USF=R1 indicates that mobile 1 (MS1) may use the following four bursts to transmit in the uplink. In the case of multislot assignment, when a mobile is assigned more than one timeslot in each TDMA frame, more than one RLC block may be transmitted during four TDMA frames, however, every single RLC block is always interleaved over four bursts on one physical channel, i.e., timeslot. Then, according to FIG. 3, if the USF=R2, this indicates that mobile 2 (MS2) may use the following four bursts to transmit in the uplink. The value "F" denotes a Packet Random Access Channel (PRACH) which is used by the mobile users to initiate uplink transmissions.

A drawback with the above-described protocol becomes apparent when considering the use of adaptive antenna arrays which increase cellular system capacity and efficient usage of scarce radio resources. The implementation of antenna arrays can allow for more efficient transmission and reception of radio signals, since the transmitted energy can be directed towards a certain receiver in antenna lobes. This significantly limits the overall interference level in cellular systems and transmitted output power may be decreased and limited to certain directions from e.g., a base station transmitter.

It is of great importance for increases in capacity of future cellular systems that such adaptive antennas be utilized efficiently. There are, however, limitations to the performance gain achieved by implementing adaptive antennas if, for example, downlink traffic directed to a specific mobile user is interleaved in the same bursts as downlink control signaling intended for other users. One example is the above-mentioned USF flag being included in downlink transmissions to a specific user. Different mobiles may be geographically distant and it is then impossible to concentrate the transmitted signal energy to only one or a few directions. It is similarly difficult to obtain an efficient power control algorithm for transmissions directed to more than one mobile user.

One other drawback with the described protocol is the (non-)possibility of introducing new modulation for certain radio blocks on downlink. Namely, the newest development in GSM suggests usage of a new higher level modulation for users with good radio conditions which then can increase the user data rate and the system throughput in general. It would be advantageous to be able to freely multiplex radio blocks using the existing and the new modulation on the downlink thus obtaining the trunking gain. In the current protocol, it is not feasible in the situations where one GPRS mobile station is monitoring the USF that has to arrive in the radio block that uses the existing modulation.

One possibility to overcome this drawback is to use a fixed allocation medium access method, where the initial setup signaling would specify when users are allowed to transmit on the uplink. There are, however, advantages with having a dynamic multiplexing in the uplink due to e.g., an increased flexibility in allocation of transmission resources.

SUMMARY

It is an object of the present invention to increase efficiency in a packet data communication system employing a dynamic resource allocation method by introducing additional flexibility in multiplexing of uplink transmission resources. By using an USF in the downlink to indicate that a mobile is scheduled to transmit an arbitrary number of consecutive radio blocks on a physical channel, the mobile does not have to listen for the USF during a number of following downlink blocks, a number based on the indication given in the channel assignment message to that particular mobile station.

The determination of what a reception of a USF indicates to the mobile station using an uplink assignment is specified in the initial signaling when assigning a transmission resource, i.e., a physical channel. In a TDMA system a physical channel may be a timeslot. In multislot systems, several timeslots may be allocated, but there will be different USF values assigned for every allocated timeslot, which may or may not indicate the same number of consecutive radio block transmissions in the uplink. Furthermore, one appearance of USF may indicate a different number of uplink radio block transmissions to different users depending on the individual channel assignments. By scheduling transmission of an arbitrary number of consecutive radio blocks for uplink transmission on a physical channel, there is no need for a mobile user to listen for USFs during that transmission, before the last uplink radio block scheduled. As a result, the transmission in the downlink can, e.g., by way of adaptive antennas and power control algorithms, be performed more efficiently and an overall interference decrease may be achieved.

BRIEF DESCRIPTION OF THE DRAWINGS

The above objects and features of the present invention will be more apparent from the following description of the preferred embodiments with reference to the accompanying drawings, wherein.

DETAILED DESCRIPTION

The invention will now be described with respect to a GPRS system where a dynamic resource allocation method is provided for multiplexing mobile users by way of an USF transmission in the downlink. Mobile users sharing a transmission resource listen to an USF transmission in the downlink in order to determine when uplink transmissions are permitted.

Figure 4:
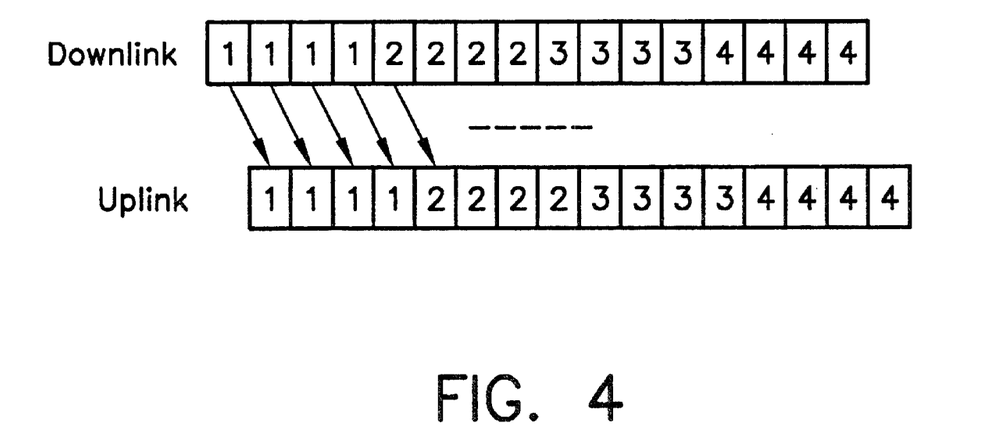
FIG. 4 illustrates uplink transmission multiplexing performed by a USF indicating transmission of one uplink radio block.

The uplink dynamic allocation method, according to conventional systems, is based on an USF granularity of one radio block, i.e., a single USF appearance in a downlink radio block determines the uplink reservation for only one block. This is illustrated in FIG. 4, where every downlink radio block includes an USF allocating the following uplink block to a mobile user.

The present invention recognizes that the USF granularity can be altered per single channel allocation from one to several consecutive blocks which means that a single appearance of the allocated USF is interpreted by a mobile station as an allocation of several sequential radio blocks for uplink transfer. This technique slightly diminishes the flexibility of the dynamic allocation method, but provides advantages for other applications.

Because the reservation of a plurality of blocks on the uplink can start anywhere, it is advantageous to broadcast the proper USF only in the first block in the sequence, while in the rest of the radio blocks an unused value for USF is transmitted in order to prevent other users from transmitting in the uplink. A mobile which earlier has received an allocation indication for a number of consecutive radio blocks will, upon receiving such an unused USF, ignore this for the period defined by the uplink allocation. An unused USF value should be available on a packet data channel also for other purposes, e.g., to have a way to keep MSs from transmitting on the uplink in certain cases, such as during certain control information transmissions.

Figure 5:
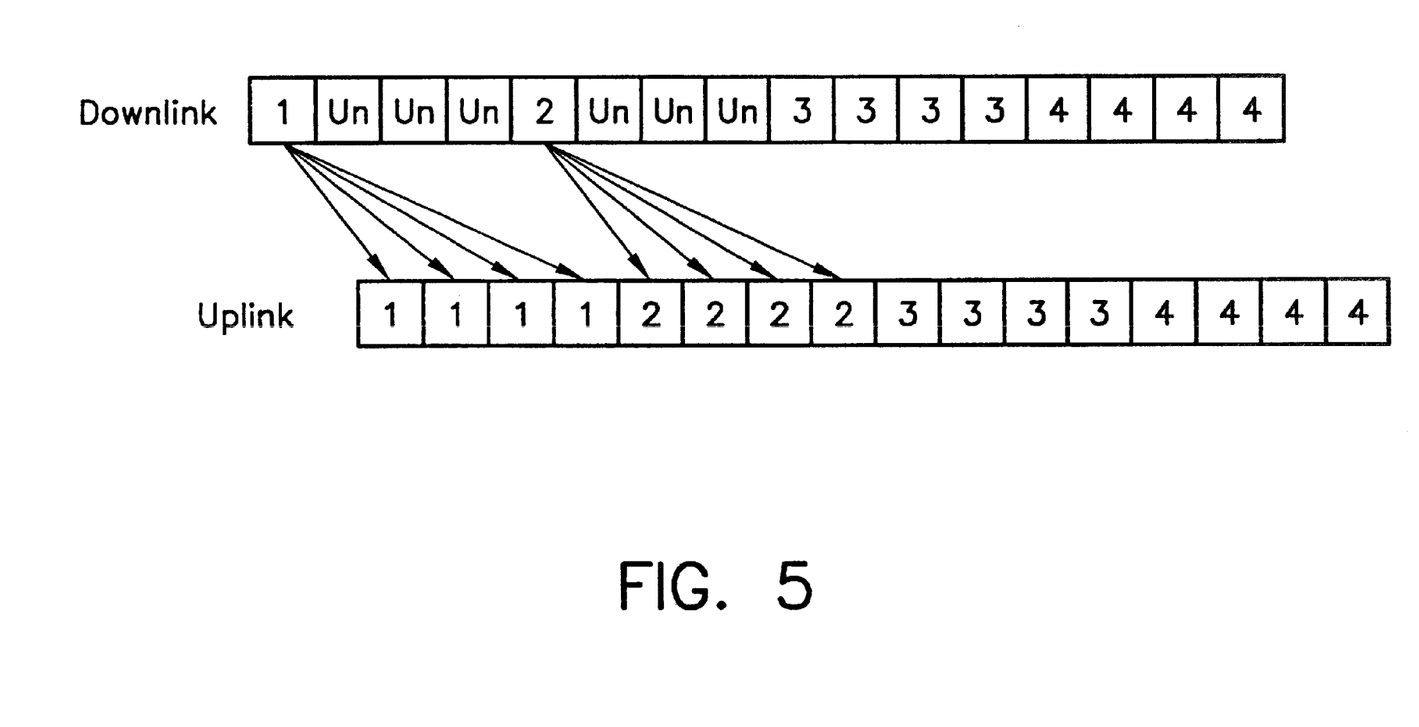
FIG. 5 illustrates uplink transmission multiplexing performed by a USF indicating transmission of more than one uplink radio block.

By allocating, for example, four consecutive radio blocks on one uplink timeslot by one appearance of USF, it is possible to use the other 3 radio blocks more freely on the downlink. This would greatly simplify the use of adaptive antenna arrays, where at least three out of four radio blocks in the downlink may be sent within lobes directed towards the mobile station (MS) currently receiving downlink radio blocks. This allocation example is illustrated in FIG. 5. In FIG. 5, an USF is illustrated indicating that four consecutive radio blocks are allocated to mobile 1. The allocation is indicated only in the first radio block and provides that the next and following three radio blocks are available for the uplink transmission. The three consecutive downlink blocks, following the radio block indicating allocation to mobile 1, include an unused USF (Un) that indicates that MSs receiving this should not transmit on the uplink. During this time the downlink transmission does not have to reach mobile 1 for uplink transmission multiplexing purposes, and may instead be directed, by way of an antenna array transmission lobe, to the mobile receiving in the downlink. This may of course sometimes be the same as the mobile scheduled to transmit in the uplink.

One skilled in the art would recognize that the number of consecutive radio blocks illustrated in FIG. 5 was provided merely by way of example. In fact, it is possible to schedule any number of consecutive radio blocks in the uplink. The meaning of an USF is defined in the initial signaling and allocation of a physical channel to a mobile user. In an alternative embodiment of the present invention, where the meaning of an USF is the same for all mobiles in e.g., a certain cell, it may also be possible to broadcast the number of blocks that a mobile user may transmit. It is also possible that the USF itself may be used to specify the number of consecutive radio blocks to be transmitted. In such a situation, the USF may require additional information symbols in order to convey the appropriate number of blocks to the mobile user.

Figure 6A:
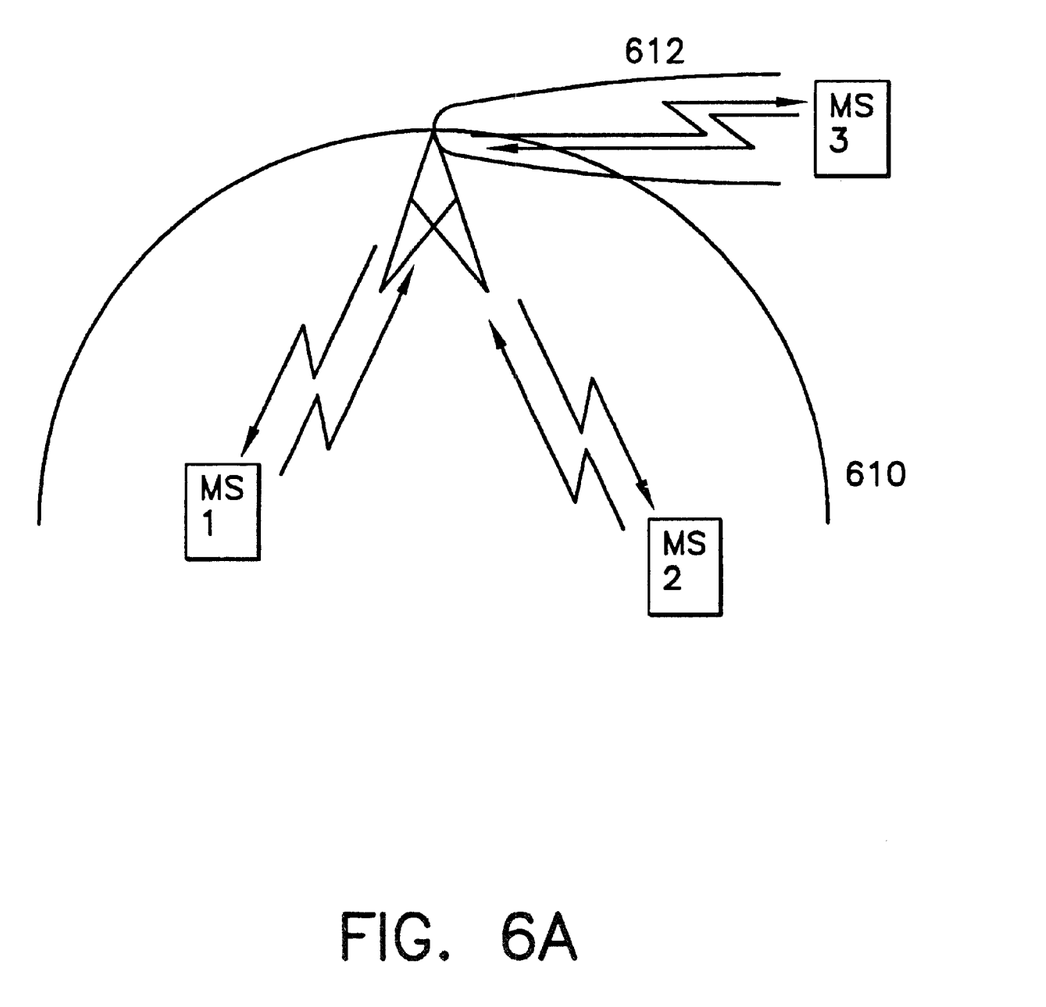
FIGS. 6A and 6B illustrate an exemplary traffic situation in a packet data communication system according to the present invention.
Figure 6B:
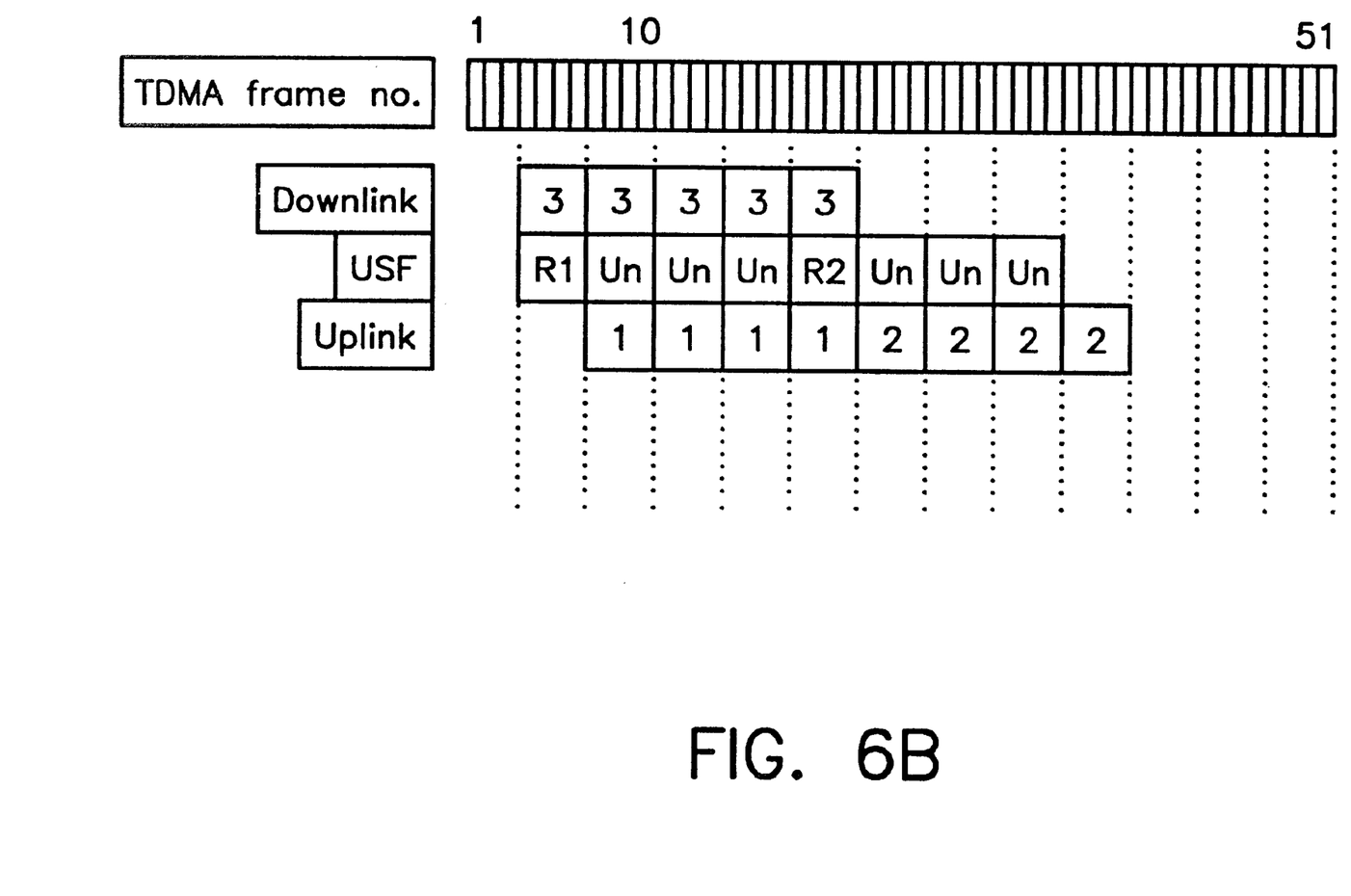

FIGS. 6A and 6B illustrate an exemplary traffic situation according to the present invention where a physical channel is shared by three mobiles. It should be noted that control signaling has been left out of the figure since it is not necessary for a proper understanding of the invention.

As indicated in the TDMA frame scheme of FIG. 6B, a mobile 1 receives an USF (R1) on an assigned physical carrier, e.g. a timeslot, indicating that transmission in the uplink is allowed for the following four consecutive radio block periods. In GPRS, this corresponds to the following 16 TDMA frames. The USF indicating mobile 1 is included in downlink transmissions to mobile 3. This downlink radio block is broadcast to all mobiles sharing the same physical channel. Mobile 2 may also receive the downlink transmission and the USF which would indicate to mobile 2 that no resources are allocated for uplink transmission. In the following radio block, TDMA frames 8–11, an uplink transmission from mobile 1 occurs, while the downlink transmission to mobile 3 is continued. In this downlink radio block, it is possible to only transmit to mobile 3, since mobile 1 already knows that four consecutive blocks are allocated in the uplink. An unused USF (Un) is then interleaved in the downlink to prevent other mobiles from transmitting in the uplink. During the last scheduled uplink radio block, TDMA frames 19–22, the downlink transmission must again be broadcast to all users to make sure that mobile 2, which is indicated in the USF, (R2), as well as other users, receive the uplink allocation of yet another number of consecutive blocks. Then, the above-described course of events occur again.

It should be noted that a mobile user may have additional physical channels, e.g., timeslots allocated on the same or different frequencies, where similar, but not necessarily the same, USF indications apply. Any number of consecutive radio blocks may be indicated by a USF and the number is defined per mobile user basis in the initial signaling.

In FIG. 6A, two antenna directions, or lobes 610 and 612, are depicted. These lobes illustrate that the downlink transmission including an unused USF may be directed to the mobile receiving data in the downlink only, i.e., mobile 3 in the example described above. This is possible in a system where adaptive antenna arrays are implemented. By limiting the transmission of signal energy to certain angle intervals, and perhaps also power control with respect to only one (or a few) mobiles, a significant interference level decrease may be achieved.

Although the invention has been described with respect to a GPRS system, it will be understood by a person skilled in the art that similar modifications to uplink transmission multiplexing may be performed in other packet data systems as well, and similar advantages as those mentioned may be achieved. Accordingly, the invention should not be considered to be limited to the described embodiments, but defined only by the following claims which are intended to embrace all equivalents thereof.

What is claimed is:

1. A method for transmitting information in a packet switched communication system where uplink and downlink transmissions are segmented into radio blocks and a number of mobile stations share a single transmission resource, said method comprising the steps of:

informing a mobile station of an arbitrary number of radio blocks that can be consecutively transmitted upon receipt of an uplink state flag;

transmitting an uplink state flag in a downlink transmission to said mobile station in order to initiate an uplink transmission of said arbitrary number of radio blocks; and consecutively transmitting, by said mobile station, said number of blocks in said uplink transmission.

2. The method according to claim 1 further comprising the step of:

transmitting, during said consecutive transmission of said arbitrary number of radio blocks when said arbitrary number is greater than one, at least one Unused uplink state flag for indicating that other mobile stations are prevented from transmitting on the uplink of the transmission resource.

3. The method according to claim 1, wherein said step of informing further comprises:

broadcasting a value of said arbitrary number of blocks to said mobile stations.

4. The method according to claim 1, wherein said step of informing further comprises:

specifying a value of said arbitrary number of blocks when transmission resources are allocated between a mobile station and said system.

5. A method for scheduling uplink transmissions in a communication system where uplink and downlink transmissions are segmented into radio blocks and a number of mobile stations share a single transmission resource, said method comprising the steps of:

transmitting an indicator in a downlink transmission to a mobile station during setup of a radio connection between said mobile station and a base station;

wherein said indicator indicates a number of radio blocks that the mobile station can transmit consecutively on the transmission resource upon receipt of a flag directed to said mobile station.

6. The method according to claim 5 wherein the communication system is a radio packet communication system.

7. The method according to claim 5 wherein the communication system is a Time-Division Multiple Access (TDMA) system.

8. A system for transmitting information in a packet switched communication system where uplink and downlink transmissions are segmented into radio blocks and a number of mobile stations share a single transmission resource, said system comprising:

means for informing a mobile station of an arbitrary number of radio blocks that can be consecutively transmitted upon receipt of an uplink state flag;

means for transmitting an uplink state flag in a downlink transmission to said mobile station in order to initiate an uplink transmission of said arbitrary number of radio blocks; and means for consecutively transmitting, by said mobile station, said number of blocks in said uplink transmission.

9. The system according to claim 8 further comprising means for transmitting, during said consecutive transmission of said arbitrary number of radio blocks when said arbitrary number is greater than one, at least one Unused uplink state flag for indicating that other mobile stations are prevented from transmitting on the uplink of the transmission resource.

10. The system according to claim 8, wherein said means for informing further comprises:

means for broadcasting a value of said arbitrary number of blocks to said mobile stations.

11. The system according to claim 8, wherein said means for informing further comprises:

means for specifying a value of said arbitrary number of blocks when transmission resources are allocated between a mobile station and said system.

12. A method for transmitting data packets comprising the steps of:

broadcasting data packets including an uplink state flag in a first set of a plurality of antenna lobes; and transmitting data packets in a second set of said plurality of antenna lobes directed toward a particular mobile station, wherein said uplink state flag identifies which mobile station can transmit, on the uplink, a predetermined, consecutive number of blocks.

13. A base station for transmitting data packets comprising:

an array antenna for transmitting said data packets in at least one of a plurality of antenna lobes; and means for broadcasting packets including an uplink state flag in a first set of said plurality of lobes and for transmitting packets in a second set of said plurality of lobes directed toward a particular mobile station, wherein said uplink state flag identifies which mobile station can transmit, on the uplink, a predetermined, consecutive number of blocks.

14. A method for scheduling uplink transmissions in a communication system where uplink and downlink transmissions are segmented into radio blocks and a number of mobile stations share a single transmission resource, said method comprising the steps of:

transmitting an uplink state flag in a downlink transmission to a mobile station during setup of a radio connection between said mobile station and a base station;

wherein said uplink state flag indicates a number of radio blocks that the mobile station can transmit consecutively on the transmission resource.

15. The method according to claim 14 further comprising the step of:

transmitting, during a transmission of said number of radio blocks when said number of blocks is greater than one, at least one Unused uplink state flag for indicating that transmission on the uplink of the transmission resource is not permitted.

16. The method according to claim 14 wherein the communication system is a radio packet communication system.

17. The method according to claim 14 wherein the communication system is a Time-Division Multiple Access (TDMA) system.

18. The method according to claim 14 wherein said base station comprises an adaptive antenna array.

19. A system for scheduling uplink transmissions in a communication system where uplink and downlink transmissions are segmented into radio blocks, said system comprising:

a single transmission resource which is shared by a number of mobile stations; and means for transmitting an uplink state flag in a downlink transmission to a mobile station during a setup of a connection between said mobile station and a base station;

wherein said uplink state flag indicates a number of radio blocks that the mobile station can transmit consecutively on the transmission resource.

20. The system according to claim 19 further comprising means for transmitting, during a transmission of said number of radio blocks when said number of radio blocks is greater than one, at least one Unused uplink state flag for indicating that other mobile stations are prevented from transmitting on an uplink of the transmission resource.

21. The system according to claim 19 wherein the communication system is a radio packet communication system.

22. The system according to claim 19 wherein the communication system is a Time-Division Multiple Access (TDMA) system.

23. The system according to claim 19 wherein said base station comprises an adaptive antenna array.

* * * * *